Sept. 20, 1932.     W. C. THOMPSON     1,878,732
SPIN-O-PLANE
Filed Jan. 4, 1928     4 Sheets-Sheet 1
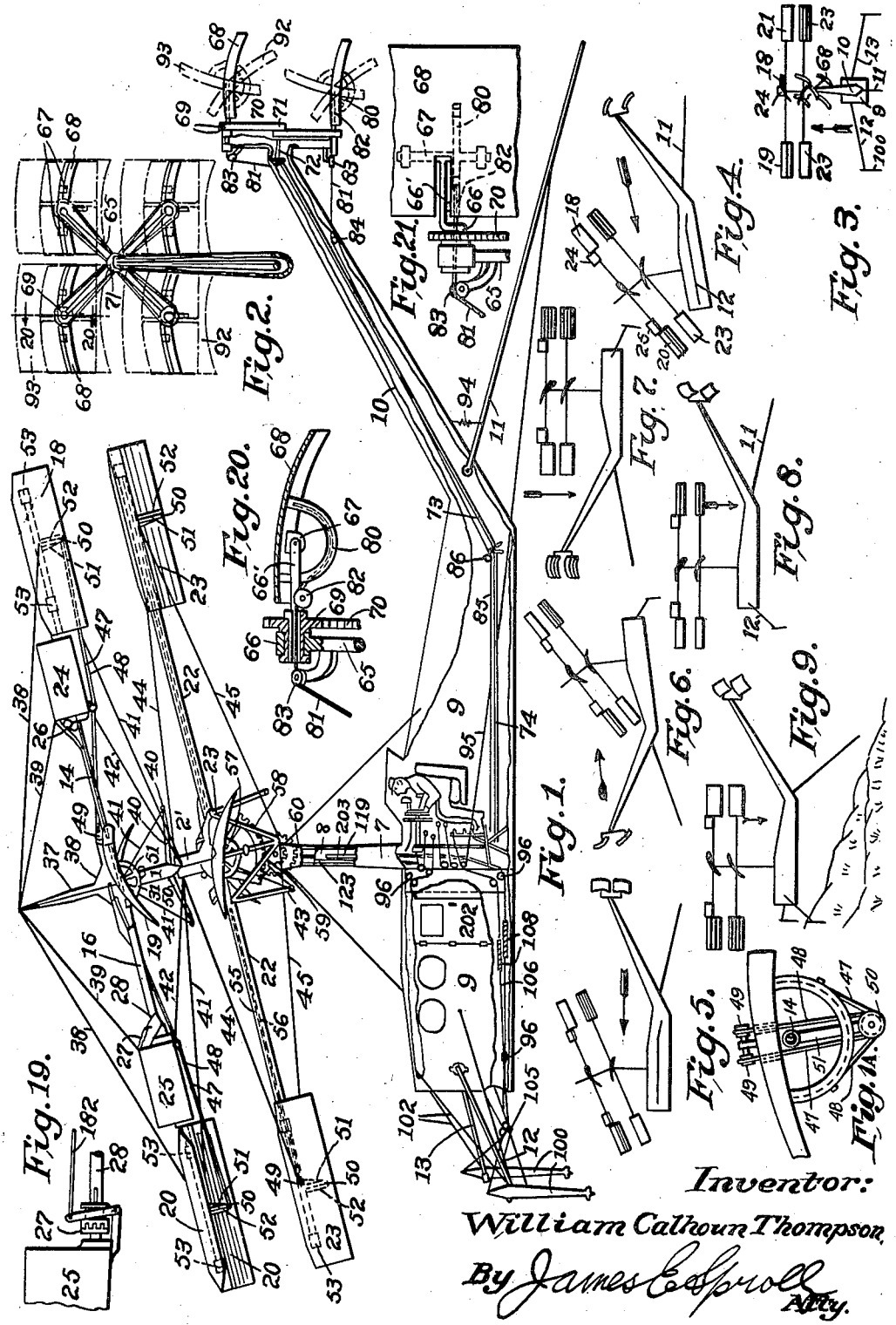
Inventor:
William Calhoun Thompson
By James E. Carroll
Atty.

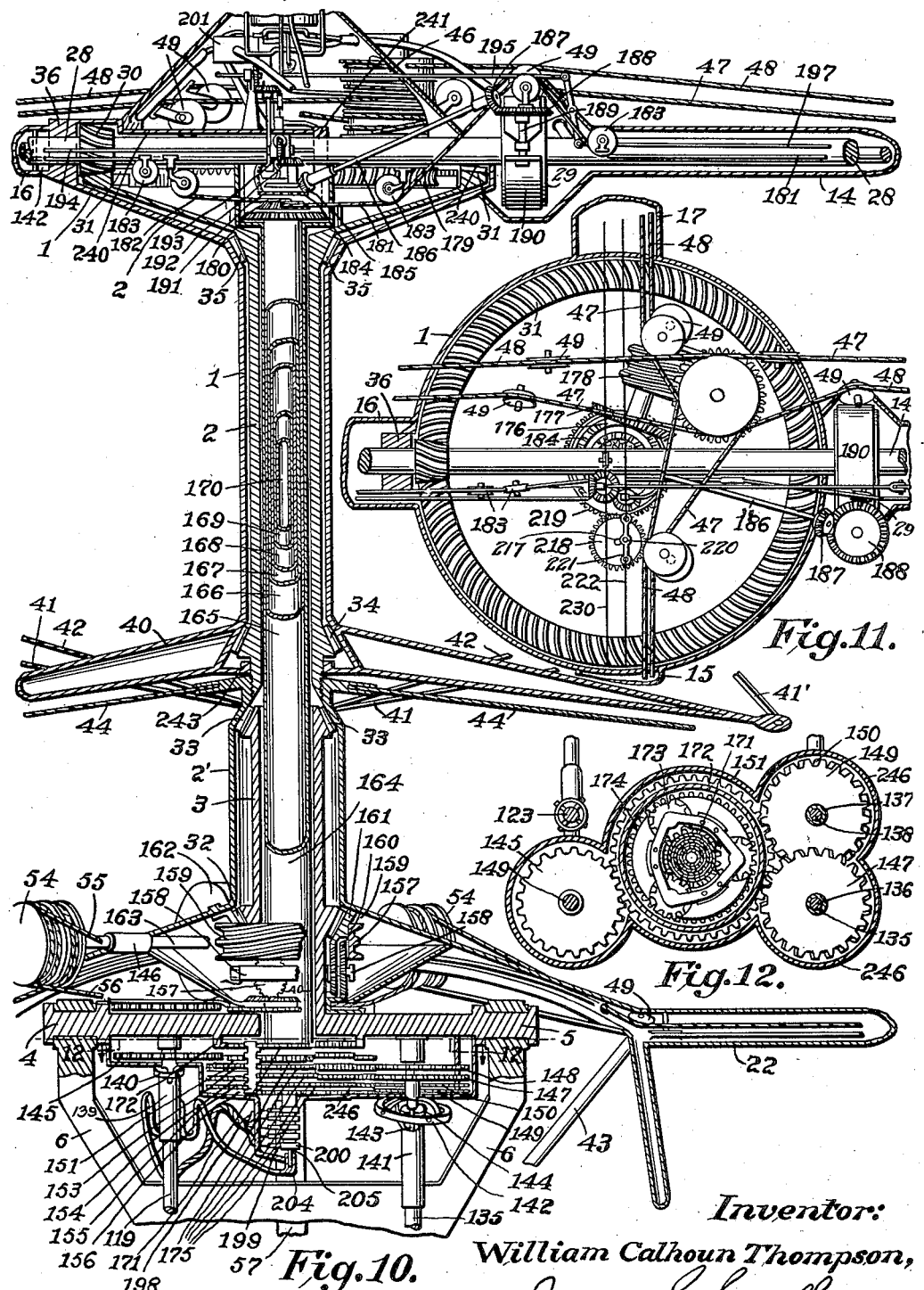

Sept. 20, 1932.  W. C. THOMPSON  1,878,732
SPIN-O-PLANE
Filed Jan. 4, 1928  4 Sheets-Sheet 3
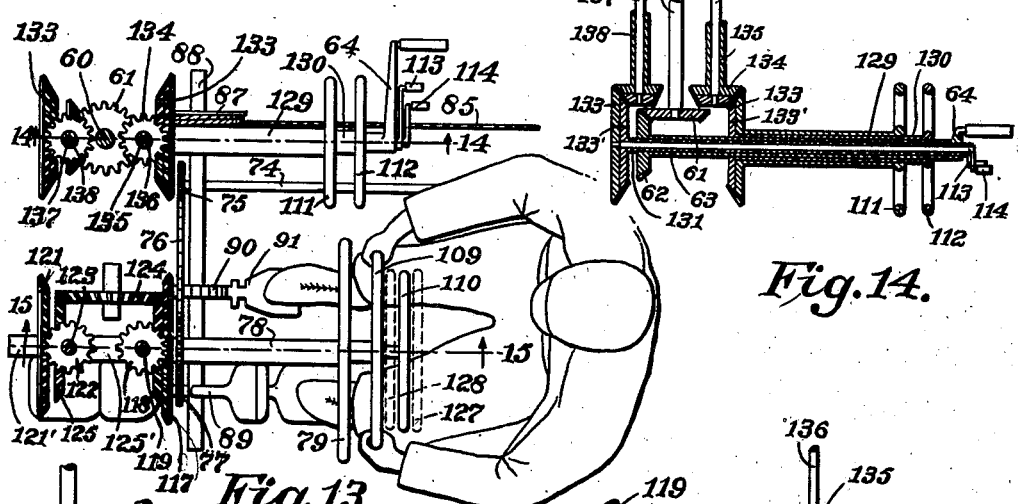
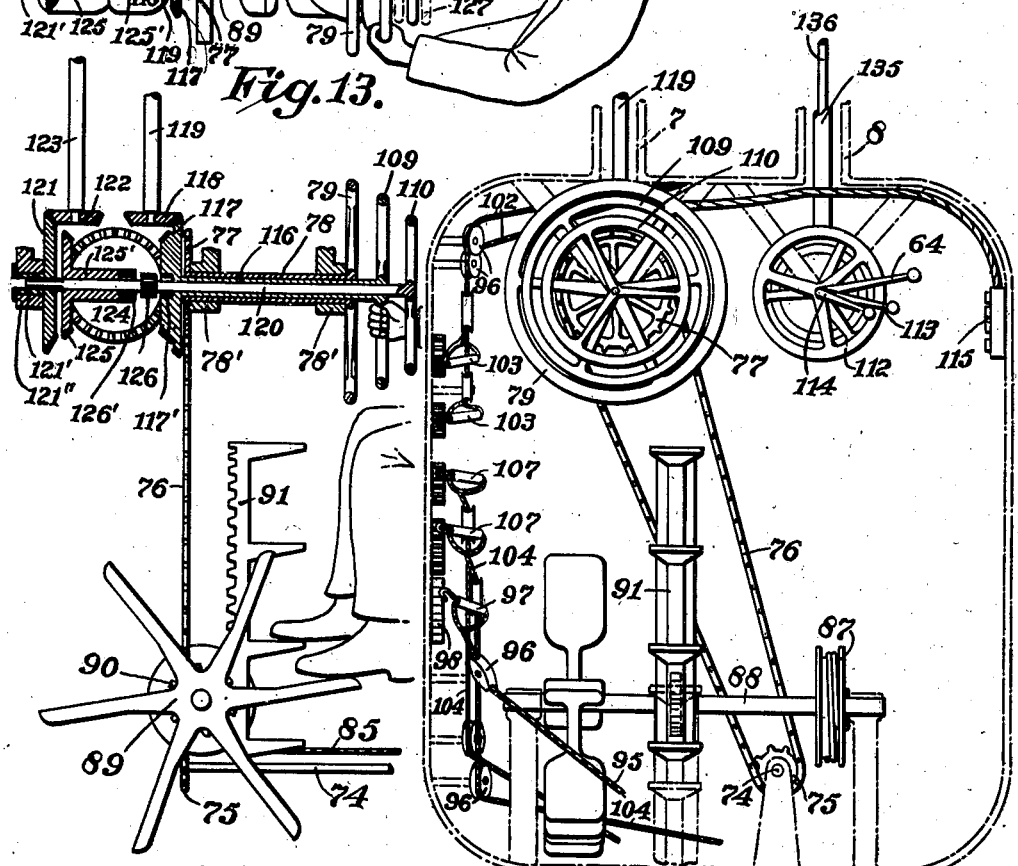
Inventor:
William Calhoun Thompson,

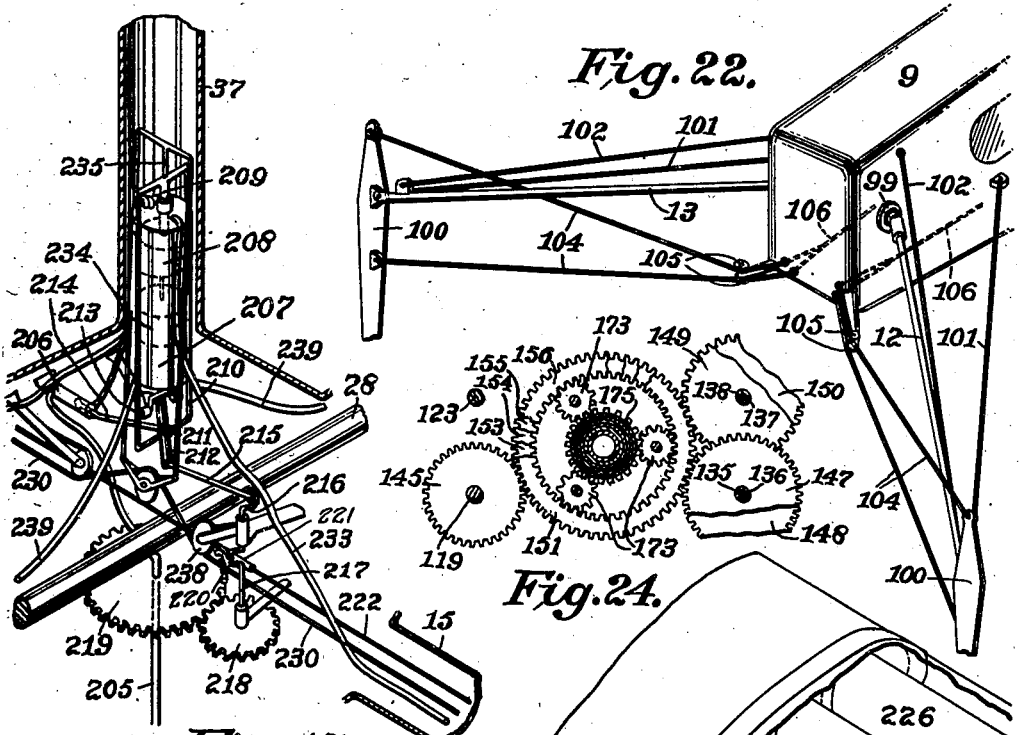
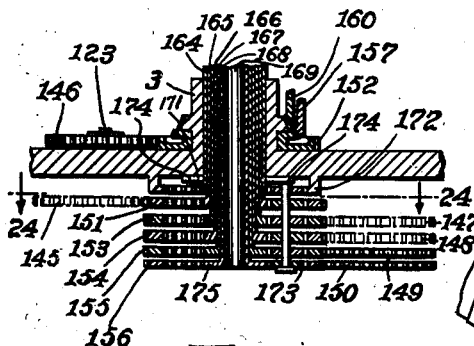
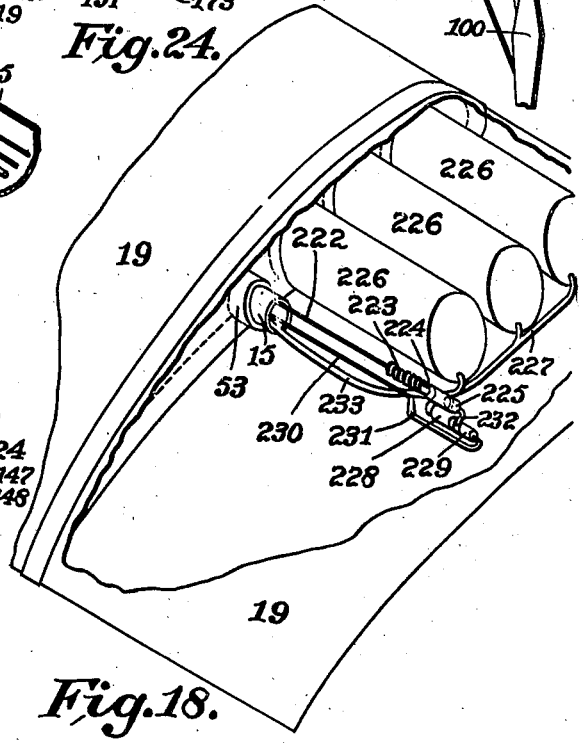

Patented Sept. 20, 1932

1,878,732

UNITED STATES PATENT OFFICE

WILLIAM CALHOUN THOMPSON, OF SEATTLE, WASHINGTON

SPIN-O-PLANE

Application filed January 4, 1928. Serial No. 244,449.

My invention relates to improvements in both aeroplanes and helicopters. My objects are: first, to put the lifting force of horizontal wings and the momentum to maintain that lifting force even after the power is shut off, which the aeroplane has, into circular motion, with wings large enough and moving in circles big enough to cause body below, uninfluenced by their turning and containing pilot with load, to take off straight up from the ground and, without engine power to settle straight down without any shock whatsoever; and second, to produce and control horizontal and vertical flight in any combination in any direction at any speed from stationary in the air to that made by full power of engines, all by wing pressure on air in a single direction for maximum efficiency, instead of two (from propeller and wings) which the aeroplane has.

I attain all of these objects in a machine aptly named the spin-o-plane, having briefly:—Two sets of four pitch controlled wings each, at the ends of spider arms, the center of arms for one set being rotatably mounted upon center of those for other set, which in turn is rotatably mounted with free running bearings upon support to body below, which lands upon three outspread legs. Two opposite wings in the top set contain liquid fuel and auxiliary power equipment, while out on the arms to the other two are two engines which, thru a bevel pinion gear on their common transmission shaft, turn a ring gear fastened to the lower wing set, thereby driving the two sets in opposite rotation. The support to body is in two sections, the upper one having trunnions that turn in cross piece on lower section, at the top of two uprights fastened to body from which pilot controlled gearing turns a segment gear in upper section in order to have the weight of body tilt the flying axis forward for horizontal flight or backward to stop it. Tail on body has duplicate airfoils two-way curved, rotatably controlled together as to line of flight by hand wheel and controlled within that controlled position to turn at right angles from said line of flight, by cables pulled from a drum, by foot rack and pinion to take out the slack rapidly, and by foot paddle wheel to make airfoils effective in order to control direction of body in any possible flight and to help with the tilting of the flying axis. Legs have brace cables adjustable before landing for uneven ground which at the same time allows the front legs to swing back in flight to reduce air resistance. Three tension braces from hub of the set it is in, to each wing and each engine pull against both its spider arm and its centrifugal force, the latter being in flight sufficient to require no greater strength of spider arms than is necessary while still, making light construction that causes the wings, aeroplane like, to move in large radius circles.

Turn controls are transmitted across trunnion joint in body supports by means of universal and slip joints. To within the hub of the upper set these turn controls are conveyed thru telescopic shafts inside a tube inside the flying stem, fastened at top to rotate with upper set as all do except during change of controls. Planetary gears connecting an outside controlled sun gear with inside sun gear on one of said telescope shafts have bearings in the same ring with those for the other controls and with planetary gears having outside sun gear fastened to body support and inside sun gear fastened to said tube fastened to rotate with upper set, each outside and inside sun gear pair being in the same ratio, causing a controlled turn of outer sun to produce a reverse turn of inner sun with its telescope shaft from the rotating position of the tube fastened to upper set in which it turns. Wing control to lower set is by similar mechanism outside of the flying stem. A central worm-and-gear controlled drum mounted on each set operates a pair of cables to each wing for its pitch control. In the body, separate wheels operate wings on each set which may be fastened to work together or oppositely, as desired when generated power stops and lower set reverses rotation to go with heavy upper set. Upper set has also a control for either of both clutches to engines, one for brake on transmission shaft and separate control for each engine. Inside last telescopic shaft is tube containing electric wires, brush connected, and liquid fuel pipe line connected with tight fitting bearing to body support. A feed tank for both engines in the center of upper set has a high float that controls a pump to draw fuel from the tank in body and a lower float which releases fuel from the wing tanks having the greater centrifugal pressure to be pumped to feed tank by constantly working pump.

From before taking off until after landing, the upper wing set constantly rotates the same way, at a speed sufficient, with upturning of wings, for its momentum to lift the whole machine up a short distance without engine power or to break the descent completely at landing. Even if, while hovering near the ground, the engines should stop, causing lower wings to reverse rotation to go with upper, and the pilot were too slow to handle controls, the upper wings would continue to support the machine to make a slow landing, while the downward push of air upon the convex side of the lower wings would be comparatively negligible. But, the pilot could quickly reverse the pitch also of lower wings so they too would help support machine and at landing, increase the up-pitch of all wings gradually to break the fall completely.

To land from high above ground, after horizontal flight is stopped, the normal course is: to stop the power, apply the brake to transmission shaft to make sure that lower wings reverse and continue to revolve with upper wings, reverse the pitch of upper wings so that downward pull of whole machine on all wings makes them increase their speed of revolution, increasing thereby the amount of momentum, and then as approaching the landing gradually reverse and increase the pitch of all wings, while momentum is being given up, in order to completely stop the descent at landing. In such a descent each wing makes a helical curve that, straightened out horizontally, would make exactly the same curve as a gliding and landing aeroplane with level field to land upon, makes.

For travel, the tilting of flying axis forward from vertical causes the wings to press upon the air in a diagonal direction which, according to the parallelogram of forces, with the weight of entire machine constant in the vertical direction as on one side of the parallelogram, produces motion in the direction of the other side which in its length represents the air resistance to that motion, which is level horizontal, up and forward, or down and forward according to the pressure and direction of pressure of the wings upon the air. This pressure can be controlled either with the speed of engines or the pitch of wings. While traveling, the speed of the whole is added to the revolving speed of each wing while straight out at the side at which it is revolving forward so that it actually goes thru the air approximately twice as fast as the wing at the front or that at the back while its opposite wing is practically standing still. This puts about two thirds of the lifting force of one set of wings on one side (that of a wing being at the square of its speed) all of the time while traveling, because as the wing straight out begins to lose its greatest speed one comes up from behind faster than normal. This keeps the side lift on one wing set constantly balanced by that of the other wing set, regardless of the relative positions of the two sets. But were there only two wings to each set, travel would cause a series of bumps as each wing revolved forward, eliminated by the four wings to each set of the spin-o-plane.

The spin-o-plane is more fully described with the accompanying drawings, in which:—

Fig. 1 is a side elevation of the whole machine in which the engines happen to be turned front and back, and having some parts cut away to show hidden workings.

Fig. 1a is a detail view.

Fig. 2 is a front elevation of the tail.

Figures 3 to 9 inclusive are diagrams showing the maneuverability of the spin-o-plane by controls of wings, of trunnion joint for axis tilting, of tail both ways, and showing leg adaptability. The arrow in each figure indicates both the speed and the direction of flight.

Fig. 3 is a rear elevation diagram showing spinoplane going straight up with tail turning it to the left.

Fig. 4 is a left side elevation diagram showing tilting of axis from trunnions augmented by tail tilting of whole machine in order to produce maximum speed, legs turned back.

Fig. 5 is left side elevation diagram showing tail airfoils upright for horizontal turn.

Fig. 6 is right side elevation diagram showing tail and axis tilting controls both used to stop horizontal motion of spinoplane.

Fig. 7 is right side elevation diagram showing the long part of a high descent with power cut off and lower wings in reverse revolution, and showing tail then turning body to the right.

Fig. 8 is left side elevation diagram showing descent being slowed up by diminishing the down pitch of all wing, showing tail airfoils flapping without influence from the position of rotation control they were left in in Fig. 7. Power still cut off.

Fig. 9 is left side elevation diagram showing the pitch of all wings reversed from that in Figs. 7 and 8 in order to pull up to make the landing a slow settling down, showing also the legs adjusted so that body will be level when they land upon uneven ground. Power from engines still not used.

Fig. 10 is cross section of flying stem from the rear while engines happen to be sideways so that all but connections with body appears as in Fig. 1 though on a much larger scale with control mechanisms standing out and some partly cut away, and power transmission shaft standing out.

Fig. 11 is top view of stem as in Fig. 10 showing control mechanism above power transmission ring gear.

Fig. 12 is cross section along line 12—12 in Fig. 10 showing planetary gearing device for conveying rotation to the top wing set.

Fig. 13 is plan diagram of pilot's controls in body.

Fig. 14 is vertical section of controls to pilot's left along line 14, 14 in Fig. 13.

Fig. 15 is vertical section of control to pilot's right along line 15, 15 in Fig. 13, with side diagram of foot controls.

Fig. 16 is rear elevation of pilot's controls showing with dash lines the cross section of body with supports for controls.

Fig. 17 is view in perspective of liquid fuel feed tank in top of flying stem, showing mechanism for supplying fuel from tanks in body and the two wings.

Fig. 18 is view in perspective from same direction as Fig. 17 of mechanism in fuel wing for pumping and maintaining balance of fuel in two wings.

Fig. 19 is an enlarged fragmentary detail of the engine clutch mechanism.

Fig. 20 is a longitudinal section taken through line 20—20 in Fig. 2.

Fig. 21 is a fragmentary plan view of one of the airfoils.

Fig. 22 is a perspective view of the forward landing gear.

Fig. 23 is a vertical medial section of the planetary gearing employed in the spin-o-plane controls, and Fig. 24 is a horizontal section taken through line 24—24 of Fig. 23.

Throughout the several drawings, similar numerals refer to similar parts.

Beginning now the more detailed description of the invention the numeral 1 designates a hub rotatably mounted upon a hollow post 2, the lower portion of which is enlarged and extends below hub 1 to provide a hub 2', which is rotatably mounted upon hollow post 3, which by means of side trunnions 4, 5 extending from its bottom is pivotally mounted upon cross piece 6, attached across the top of hollow uprights 7, 8 which in turn are attached to top of body 9, in appearance like an aeroplane fuselage, having tail 10, and standing upon the ground upon outspread legs 11, 12, 13.

Extending straight out from top of hub 1 are hollow spider arms 14, 15, 16, 17 with wings 18, 19, 20, 21 respectively pivotally mounted about their outer ends. Likewise straight out from the bottom of hub 2 extend four spider arms 22 upon which are likewise pivotally mounted four wings 23.

Out towards wings 18, 20 on spider arms 14, 16 are mounted engines 24, 25 each with clutch 26, 27 respectively connecting them with transmission shaft 28 rotatably mounted inside both spider arms 14, 16, and to which are attached brake drum 29 and pinion gear 30 geared with bevel spiral gear 31 attached to the top of post 2. When either or both engines thus drive hub 2' to the right about post 3 upon cone bearing 32, 33, hub 1 is driven to the left on cone bearings 34, 35 by the back pressure upon pinion 30 applied to hub 1 thru shaft 28 principally at bearing 36. When, as normally, each hub is driven equally, the ratio of number of turns of transmission shaft to turns of one hub is exactly twice the ratio of ring gear 31 to pinion 30. With hub 1, spider arms 14, 15, 16, 17 with their wings 18, 19, 20, 21 and engines 24, 25 are driven to revolve to the left while spider arms 22 with their wings 23 are driven to revolve to the right with hub 2', giving either or both engines a direct pull upon each wing thru a single pair of gears. The wings grip the air as would propeller blades but are different from them besides in being bigger and moving in larger circles, in that each is not a continuous airfoil from the center out to stir up a commotion in the whole air, but is a distinct airfoil unit at a distance from the center that moves thru comparatively new air as if an aeroplane glider moved thru the air at the end of a long pole.

An upward extension of hub 1 is post 37 to which are attached tension braces 38 to each spider arm for support for each wing 18, 19, 20, 21 in the middle of the wing, and tension braces 39, to each engine 24, 25. To bottom of hub 1 are four short bracket arms 40, each having two tension braces 41 attached at its outer end for the wing support on each side, and the two directly beneath spider arms 15, 17 each having tension braces 42 to each engine 24, 25 (in Fig. 1 each line 41, 42 represents two tension braces, one behind the other; one in front and other in back of center.) This gives three tension braces to points on spider arms most needing them to hub 1; each point having one up pulling brace and two pulling side and downwards against the rigidity of the spider arm only, while standing still upon the ground, but pulling against the centrifugal force of the wing or engine augmented with push of the spider arm while in use, making the spider arm strength required only sufficient to uphold the parts while idle as the centrifugal force increasing with increasing requirements causes the three tensions to hold wings and engines in place during flight.

Hub 2' has a framework 43 below it clearing trunnions 4, 5 and body uprights 7, 8 when hub turns, that rigidly braces each of four points below to the base of the three nearer spider arms. From top of hub 2′ extend tension braces 44 to each of the four spider arms 22 at the middle of wings 23 to which are also fastened tension braces 45, one from the braced point at each side of framework 43. Thus each wing 23 is braced by three tensions to hub 2′ exactly as wings above are braced to hub 1.

From a drum 46, the control of which is hereinafter fully described, rotatably mounted off center on the top of hub 1, extend for cables 47 and four cables 48, guided by pulleys 49 so that one cable 47 and one cable 48 are stretched over two pulleys 50 mounted on short bracket arm 51 fastened to each spider below the middle of the wing and pull oppositely upon segment wheel 52 attached underneath to each wing, with center in line with wing bearing 53 upon spider arms 14, 15, 16, 17. One end of each cable is fastened to front and other to back of segment wheel 52 so that they hold wing in position about its spider arm and change it when drum at other end is turned by control, as are the other top wings at the same time. Drums 54 on a common shaft mounted off center on hub 2′ near its bottom likewise have two cables 55, 56 pulling over more pulleys 49, 50 a segment 52 on each wing 23, controlling its wing's position about spider arm 22, or in other words, its pitch, in the same way that pitch of wings 18, 19, 20, 21 are controlled from drum 46. Guiding pulleys 49 conduct cables 47, 48, 55, 56 thru hollow spider arms, except those going to wings 18, 20 which are in the open air in order to avoid too many pulleys to carry them around engines 24, 25.

Wings 19, 21 have placed within them such power equipment as may be placed there, such as batteries, and tanks holding reserve fuel to be used last in order that they may contain weight which with that of engines disposed adjacent to the other two wings 18, 20 make a balanced smooth running flywheel to keep them revolving and useful for controlled lifting after engine power is shut off. Balanced freight may also be placed in all wings to increase their momentum. Because they always revolve the same way, wings 18, 19, 20, 21 are all one way wings being in cross section the same blunt pointed as are aeroplane wings. When power is shut off brake 29 is applied by a control hereinafter more fully described, whereby post 2 and hub 2′ are locked to hub 1, so that the fly wheel effect of the revolving engines and reserve fuel carried by the latter reverses rotation of the post 2, hub 2′ and wings 23 attached thereto and thus causes both the upper and lower sets of wings to revolve in the same direction. As the wings 23 are reversible, the front and rear edges of same are both preferably feathered, so that either may function as trailing edges upon occasion, thereby enhancing their lifting capacity when same are revolved in either direction. To eliminate the necessity of reversing the direction of rotation of the lower wings 23, freight may be stored within the same, in which event the clutches 26 and 27 are disengaged to release the lower set of wings from the upper set of wings, whereby the flywheel effect of the lower set of wings is utilized independently of the upper set.

Attached to bottom of post 3 in plane perpendicular to trunnions 4, 5 are two radial bracket arms 57 with segment gear 58 between them, geared with pinion on the same shaft cross mounted on uprights 7, 8 as beveled gear 59 which is geared with pinion on the top of shaft 60 in the center of body upright 8.

Bevel gear 61 on bottom of shaft 60 is geared with gear 62 (Fig. 14) on telescope shaft 63 having crank 64 with handle convenient to pilot's right hand. The weight attached to upper wings is just about supported by them, making that set in the air practically self supporting, while the lower set practically supports the body and contents with the lifting center at the center of trunnions. This pull of body from a constant lifting point, together with control of flying stem consisting of post 3 and hubs 1 and 2′ above it relative to body by means of above gearing, gives the pilot by turning crank 64 control for turning flying stem pivotally forward or backward from the vertical. Extending radially from the rear end of the tail 10 are relatively short arms 65 within the outer end of which are rotatably mounted longitudinally disposed shafts 66 having axially offset portions 66′ extending rearwardly therefrom, which portions are provided at their outer ends with laterally disposed trunnions 67 upon which are pivotally mounted concavo-convex airfoils 68. On each shaft 66 is a sprocket wheel 69 linked by chain 70 with sprocket wheel 71 on shaft 72 bevel geared with shaft 73 in tail 10, bevel geared with shaft 74 in body, on the front of which is sprocket wheel 75 linked by chain 76 with sprocket wheel 77 on hollow shaft 78 rotatively mounted within bearings 78′ and provided with pilot wheel 79 at rear conveniently located to pilot's seat and directly behind body upright 7. The above gearing, while having intermediate shafts 72, 73, 74 to rotate faster to permit lighter construction, has shaft 66 rotate exactly with pilot wheel to give the pilot clear control of the direction in which tail airfoils pull tail from line of body: up, down, left, right and combinations. Under each airfoil 68 is grooved arc 80 about line of trunnions 67, having a cable 81 fastened at rear end of arc, which is stretched over pulley 82 journalled on a bracket on shaft 66, thru the inside of shaft 66, over pulley 83 on tail arm 65, over pulley 84 in tail 10 to middle of tail 10 where all four cables 81 are united into larger cable 85 which is stretched over pulley 86 to drum 87 on shaft 88 on which is also paddle wheel 89 for foot lever control and pinion 90 operated by foot rack 91 so that a short foot pressure will turn shaft 88 enough to take all of the slack out of cables 85 and 81, as in different kinds of flight the tail airfoils must be allowed to blow in different positions about their hinged trunnion joints to be ineffective.

The direction of tail airfoils is first given by hand control and then made effective in that direction according to foot pressure upon paddle wheel. In Figs. 1 and 2 the dotted line position 92 of airfoils 68 showing rear end swung downwards by cable tension is for tilting the flying axis with the rest of the spinoplane farther forward while traveling, while position 93 of airfoils shows the way they flap during descent with foot cable released during descent without change in hand control from position 92.

Near the base of tail 10, leg 11, a long straight piece is hinged to swing vertically, its weight supported in flight by spring 94 and braced to hold its share of the weight of the whole spinoplane upon the ground by cable 95 stretched over pulleys 96 to handle 97 having a hook which can while in the air, be fastened in different holes 98 in line from the last pulley 96 along the wall on the left side of the pilot's compartment. The front landing gear comprises a leg 12 connected at its inner end by a universal joint 99 to the left side of the body 9 adjacent its forward end and a leg 13 similarly connected to the right side of said body, said legs being adapted to normally extend outwardly and slightly forwardly from the body 9, substantially in the manner illustrated in Fig. 22, and at their outer ends are hingedly connected to the upper portions of vertically disposed forelegs 100. A fixed cable 101 from body to end of main leg holds it from going too far forward. Cable 102 attached to end of main leg to hold it up during flight is stretched over pulleys 96 to handle 103 with hook adjustable to side of pilot's compartment. Two cables 104 to each leg, one from above, the other from below the knee joint, stretched from foreleg 100 over pulleys 105 on bracket to body in front of and below universal joint 99 and to the side of body, unite into a cable 106 which stretched over more pulleys 95 to handle 107 with hook to fasten in holes on side of pilot's compartment, is adjustable while in the air. Each of two cables 106 pulling on down bracing cables 102 for the front legs and cable 95 down bracing the rear leg have in their length within the body a spiral tension spring 108. Upon landing the stretching of springs 108 permits each leg to swing upward to absorb any small shock due to improper wing control to break fall. In the front legs, the same spring also permits foreleg 100 to swing in or out to take up the difference in spread of front legs while swinging up to absorb shock, and in case spinoplane is moving forward at landing, permits the front legs to swing back, while the back leg slides forward and catches to prevent back slipping. The releasing of handles 107 from hook positions permits the front legs to swing back while traveling and their forelegs to swing up from the force of the wind, while the handles are easily pulled back and hooked in place after the speed forward is stopped to alight. While in the air, the pilot may adjust the handles to all leg brace cables so that legs will fit uneven ground while the body lands level. (Fig. 9.)

In the pilot's compartment in body 10, all of the mechanical controls of the spinoplane, except the two foot controls 89, 91 on cable 85 to make tail airfoils 68 effective hereinbefore described, are made by turning with the pilot's hands wheels and cranks whose axles comprise two systems of telescope shafts, one directly back from below each body upright 7 and 8. To the pilot's left; farthest to reach is wheel 79 as hereinbefore described for tail direction control; then wheel 109 to control the pitch of the wings 18, 19, 20, 21 in the top set; and nearest to pilot is wheel 110 to control the pitch of wings 23 of the lower set. To the pilot's right: farthest to reach, is wheel 111 to control brake 29 on transmission shaft 28; then coming back, is wheel 112 to control both clutches 26, 27 to engines 24, 25; then a large crank 64 with handle to control tilting of flying axis about trunnions 4, 5 as hereinbefore described; then a small crank 113 to control engine 24; then nearest to pilot, a small crank 114 to control engine 25. Electrical controls are shown in Fig. 16 as in switch box 115 conveniently located on side of body to the pilot's right.

Journalled for rotation within the hollow shaft 78 is a sleeve shaft 116 provided at its projecting rear end with a handwheel 109 and at its projecting forward end with a double bevel gear 117 the larger gear of which meshes with a bevel pinion 118 fixedly secured to a vertically disposed shaft 119 extending upwardly within the hollow body upright 7, while the smaller bevel gear meshes with an idler bevel gear 124, which meshes at a diametrically opposite point with a bevel gear 125 having an inwardly directed sleeve extension 125' integrally formed thereon, said gear and correlated sleeve being mounted upon the forward portion of an axially sliding shaft 120 mounted for rotative and sliding movement within the sleeve shaft 116 and at its projecting rear end is provided with a handwheel 110. The gear 125 with its sleeve 125' is adapted for selective rotation with the shaft 120 or for independent rotation relative thereto and for this purpose said shaft 120 is provided with one half of a dental clutch 126 adapted to seat on occasion within the complemental recess 117' or within formed within the bevel gear 117 or within a complemental recess 126' formed within the inner end of the sleeve 125', all as clearly illustrated in Fig. 15. The forward splined end of the shaft 120 extends beyond the bevel gear 125 and is slidably mounted within an internally splined sleeve 121' of a bevel gear 121 journalled for rotation in a bearing 121", which bevel gear meshes with a pinion 122 fixedly secured to a vertically disposed shaft 119 extending upwardly within the hollow body upright 7. With the handwheel 110 and shaft 120 in the position illustrated in Fig. 15 only the bevel gear 121 is rotated when the handwheel 110 is turned right or left but when the latter is pulled rearwardly to the position indicated by the numeral 127 and dotted lines in Fig. 13, the clutch 126 is caused to enter the complemental recess 117' to thereby lock the handwheel 110 for rotation with the handwheel 109, and thus rotate the shafts 119 and 123 in opposite directions, while by pushing the handwheel 110 forwardly to the position indicated by the numeral 128 and dotted lines in Fig. 13, the clutch 126 is caused to engage within the complemental recess 126'; which movement effects unlocking of the handwheels 109 and 110 and causes shafts 119 and 123 to rotate in the same direction.

Excepting, while there is plenty of time, the making of changes because of the stopping of engines or for the control or releasing of them, all of the flight controls required of the pilot's hands are pilot wheel 79 for tail guiding, pilot wheel 109 directly behind that for pitch control of all wings, control of crank 64 to the right of them for tilting of the flying axis. For landing, all other controls can be finished before approaching the earth straight down, with the gyroscopic force of the fly-wheel weights turning about hub 1 tending to steady the whole spin-o-plane. So the pilot may have only wheel 79 to control at landing time. This makes the spin-o-plane as easy as the automobile to learn to drive safely.

Hereinbefore mentioned pilot's controls 111, 112, 64, 113, 114 on his right side respectively for brake, clutches, axis tilting, engine 24, and engine 25, on rear of telescope shafts 129, 130, 63, 131, 132 respectively on each of whose front end is a beveled gear 133, except on shaft 63 which is hereinbefore fully described and here dropped out, are geared with a bevel gear 134 on the bottom of each vertical shaft 135, 136, 137, 138 respectively which are in pairs of telescope shafts in the order named behind and in front of shaft 60, thru the middle of body upright 8.

Upright shafts 119, 123, each with a slip joint 139 and universal joint 140 and upright shafts 135, 136, 137, 138, the outer shafts 135, 138, each with a slip joint 141 and universal 142, the inner shafts 136, 137, each with a slip joint 143 with top part slipping inside lower part, and universal joint 144 inside of universal joint 142, are extended parallel to post 3 on the base of which the extensions are mounted. In the order numbered they serve in connecting pilot's controls 109, 110, 111, 112, 113, 114 for top wings pitch, bottom wings pitch, brake, clutches, engine 24, and engine 25 respectively thru spur gear wheels 145, 146, 147, 148, 149, 150 on their tops with ring gears 151, 152, 153, 154, 155, 156 rotatably mounted upon post 3 with the same axis as post 3. Gear 152 for control of wings in lower set is outside of post 3 above the trunnions 4, 5, while the others are below the opening thru post 3.

To the top of gear 152 is attached a beveled sun gear geared with three vertical planet gears 157 mounted on ring 158 around post 3, and planet gears 157 geared on top with a sun gear 159 rotatably mounted on bottom of hub 2' though inverted identical with lower sun gear. Smaller beveled sun gears 160 and 161 attached to post 3 and hub 2' respectively are both geared with three more planet gears 157 mounted on the same ring 158 as the first planet gears 157, causing the ring 158 with the outside gears 157 to rotate and revolve at exactly one half the rate that hub 2' rotates about post 3, which in turn causes any change in position of gear 152 with its beveled sun gear about post 3 to make an equal change, in the opposite rotation, of sun gear 159 about hub 2'. A worm attached to sun gear 159, is geared with gear 162 on shaft 163 rotatably mounted on hub 2' with drums 54 at its ends having, as hereinbefore described, cables controlling the pitch of wings 23. By using worm and gear control of drums the friction required to do so would prevent them from working backward, so that the control will always stay put, without strain of the ever turning planet gearing, except for change in control.

Fastened to the top of hub 1 and running all the way down inside of post 2 and post 3 to bottom of the latter is tube 164, inside of which are telescope shafts 165, 166, 167, 168, 169 with tube 170 inside the last as a conduit for electric wires and liquid fuel tube to body as hereinafter described. On the bottom of tube 164 is sun gear 171 in the same plane as internal sun gear 172 attached to bottom of post 3. Between them are three planet gears 173 mounted on ring 174 which is, according to the ratio between the two sun gears, given an intermediate rate of rotation about flying axis and is mounted upon tube 170 merely to support its weight. On ring 174 are also mounted three planet gears connecting a sun gear 175 on the bottom of each telescope shaft 165, 166, 167, 168, 169, each with its three planet gears in the same plane with an internal sun gear inside of each spur gear 151, 153, 154, 155, 156, control of which is hereinbefore described. Each pair of sun gears are in the same ratio as sun gears 171, 173 which determine the rate of revolution of all of the planet gears so that any change of the outside sun gear from its position as to post 3 produces a change, in opposite rotation, of the inside sun gear with its telescope shaft as to hub 1, regardless of whether hub 1 is still or rotating.

On top of shaft 165, bevel gear 176 is geared with gear 177 on same shaft as gear 178 geared with worm 179 on the same shaft as drum 46 which, as hereinbefore described controls the pitch of wings 18, 19, 20, 21. Above gearing is mounted in top of hub 1.

On top of shaft 166, wheel 180 has ends of cables 181, 182 pivotally fastened, one above the other, in its circumference. Cables are stretched in opposite directions over pulleys 183, thru spider arms 14, 16 respectively to clutches 26, 27 for engines 24, 25. A right turn of shaft 166 pulls cable 181 to release clutch 26 and when it is turned more than half way around it pulls upon cable 182 also to release clutch 27, while a left turn releases first clutch 27, then clutch 26.

On the top of shaft 167, bevel gear 184 is geared with gear 185 on shaft 186 mounted on top of hub 1, with gear 187 geared with gear 188 on screw 189 that tightens or releases brake band 190 about brake drum 29 on transmission shaft 28, used as hereinbefore described.

On top of shaft 168 a bevel gear is geared with gear 191 on same vertical shaft as bevel gear 192 geared with gear 193 thrust held in position on hub 1 while screw rod 194 on which it winds is forced forward or back thru spider arm 16 to control engine 25. With the same mechanism shaft 169 causes rod 195 to be pushed or pulled, transmitting its motion across lever 196 to pulling or pushing rod 197 inside spider arm 14 to control engine 24.

Electrical connections between hub 1 and body for controls, lights, etc. are by wires thru body upright 7 to support 198 fastened to post 3 from which brushes 199 make contacts with wheels 200 on bottom of conduit tube 170 thru the center of the flying stem, to an outlet box 201 connected with conduits thru each spider arm 14, 15, 16, 17 for engines, starters, batteries, etc.

From tank 202 in body, liquid fuel is carried thru tube 203 running thru body upright 7, having either a coil or rubber tubing at top to take up the turning of the post 3 about trunnions 4, 5, to a tight bearing 204 on support 198 on post 3, thru which it flows into end of tube 205 projecting from the bottom of tube 170 rotating with hub 1, thru which it flows to top of hub 1 thru pump 206 to the top of feed tank 207 in which upper float 208, when tank is full raises tube 209 with trunnions at top and braces 210 attached thereto extending down over the sides of tank so that the cross pin 211 between them is raised to the line of fulcrum of double slotted swinging lever 212 which is between its bearings 213, lifting with it the end of piston rod 214 of pump 206 so that pump ceases to work. But as fuel in tank is lowered, float 208 in sinking lowers pin 211 with the end of piston rod 214 down on slotted swinging lever 212 so that piston rod 214 is worked by the swinging to operate pump 206. The swinging of slotted lever 212 is accomplished by action of rod 215 pivotally attached to its bottom with its other end on crank 216 on vertical shaft 217 having spur gear 218 at bottom geared with gear 219 on top of post 2 inside of power bevel spiral gear 31, all of the time post 2 is driven by engines. Shaft 217 also has eccentric 220 on which short rod 221 oscillates with two wires 222 pulling against each other across rod and stretched thru spider arms 15, 17 respectively to the tip of wings 19, 21, where on each a spring 223 pushing on piston rod 224 to which wire 222 is fastened furnishes the tension of one wire against the other for a light weight means of carrying to a piston the oscillations given by eccentric 220 to keep pump 225 working. Each wing 19, 21 has inside tanks 226 with outlets connected with pipe 227 running into cylinder 228 with a pressure on piston 229 caused by centrifugal force according to the amount of fuel in the tanks. This pressure on pistons 229 in opposite wings causes them to pull against each other across wire 230 and bent piece 231 around each cylinder 228 so that when wire is long enough the one with greater pressure upon it will be pushed outward, unblocking the way for fuel in cylinder 228 to flow thru pipe 232 into pump 225 which pumps it thru pipe 233 into the top of tank 217. In tank 207 in lower float 234 with rod 235 running thru float 208 and its tube 209 above which it is connected with rods 236 back down outside the tank supporting between them pulley 237 which when pulled up by fuel raising float 234, lifts the middle of wire 230 which, held down by pulleys 238 on each side, is thereby shortened so that both pistons 229 block the flow of fuel from tanks in wings. But when fuel in feed tank 207 is low enough to lower pulley 237, wire 230 is lengthened to permit flow of fuel from the tanks in the wing having the most pressure, which maintains a constant balance of fuel in wings. From feed tank 207 fuel goes to both engines 24, 25 thru pipes 239 which run thru spider arms 14, 16 respectively. This feed tank supply system permits the ordinary working fuel supply to be drawn from the tank in body while the reserve wing supply adds to the total for safe landing fly-wheel inertia as well as helps in making the fly-wheel more smooth running than just two opposite weights revolving would make it.

As shown in Fig. 10 the grease that lubricates the power transmission gears 30, 31 also lubricates cone roller bearing 32, 33, 34, 35 between post 3 and hub 2' and between post 2 and hub 1, all of the planetary gearing below and around post 3 to carry controls to within the rotating parts, all the telescope control shafts inside the flying stem with the gearing at their tops, both worms and gears for wings controls, and is held in by partition 240 across the top of hub 1, which on brake side is under transmission shaft 28 with packing 241 around it near the middle and above it on side of pinion 30, having packing 242 around it outside of pinion, also where clutches 181, 182 go thru, around brake control shaft 186, shaft between worm gear 179 and drum 46, and around each vertical shaft for gearing for engine control rods. Said partition 240 across top of hub 1 also supports tube 164 running thru flying stem outside of telescope shafts for controls. The grease is held in at bottom of hub 1 by packing 243 around post 2, at shaft 163 on post 2 by packing around it between worm 162 and each drum 54, at bottom of hub 2 by packing on hub 2 around gear wheel 152 and also packing on post 3 around same gear wheel 152, in the bottom of post 3 by a cover 246 around planetary gearing and spur gears geared with it attached to post 3 with packing around shafts 119, 123, 135, 138 with packing 247 around tube 170.

The engines 24, 25 are represented merely by locations of Fig. 1 out at a distance on spider arms 14, 16. Their only requirements in this preferred specification of my invention are: that they connect by means of clutches 26, 27 respectively, with transmission shaft 28 and provide it with sufficient efficient power for flight of spinoplane; that their weights are at a sufficient distance from the flying axis out on arms 14, 16 with wings revolving at a minimum flying speed, to contain approximately one half enough fly-wheel energy when applied to wings to cause them to lift up enough to stop the descent of the spinoplane from the speed it is given by the gravity pull upon the wings as they coast in spirals. The number of tail airfoils is a preferred example, as are parts, devices and combinations throughout the entire machine, which may be changed without taking them from the scope of my invention. So to the above described preferred example of all of the parts, devices and combinations, I add the matter in the following claims as a more complete description of my invention. I am aware that, previous to this, flying machines have been designed with various propeller-like airfoils revolving oppositely about the same axis, some having power plant placed in rotating part, and some having various carriage devices below for the pilot, so I do not make a broad claim to that type of flying machine.

In the operation of the spinoplane, assuming the same to be in a take-off position illustrated in Fig. 3, for vertical flight, the engines 24 and 25 are started causing the upper and lower sets of wings to revolve in opposite directions, when sufficient speed is attained by the upper set of wings for safety momentum, all of the wings are then pitched upward by interlocking handwheel 110 with handwheel 109 and rotating the same, whereupon the spin-o-plane rises vertically, as this occurs the pilot manipulates handwheel 79 to the left to turn the tail airfoils 68 to the positions shown in Fig. 3, which causes the spin-o-plane to turn in left hand direction. Upon reaching the proper altitude, the spin-o-plane is changed from vertical flight to forward flight by tilting the axis of the upper and lower sets of wings, which is effected by turning hand crank 64 and manipulating the handwheel 79 to return tail airfoils 68 to the position, thereby causing the spin-o-plane to tip forwardly and downwardly in the manner illustrated. To turn the spin-o-plane in horizontal flight the tail airfoils 68 are turned to the vertical positon indicated in Fig. 5, and depending upon the disposition of the concavo-convex faces thereof, the spin-o-plane may be turned to the right or to the left. The elevation of the spin-o-plane during forward flight is changed by varying the pitch of the wings or the speed of the engines. To land the spin-o-plane at a desired point the horizontal motion of the same is stopped directly above said point by tilting the upper and lower sets of wings backwards and turning the tail airfoils to the position shown in Fig. 6, whereupon the engines 24 and 25 are stopped and the brake 29 applied by handwheel 111, which reverses the direction of revolution of the lower set of wings, causing the latter to revolve in the same direction as the upper set of wings. The control wheel 110 is then moved to a neutral position and the wheel 109 turned to pitch the upper set of wings downward, so that the latter have the same pitch as the lower wings, as shown in Fig. 7. The handwheel 110 is then pushed inwardly to thereby effect unified control of all wings, which are then in the position to utilize the descent of the spin-o-plane to maintain or increase the speed of the revolving wings. The tail airfoils 68 are then adjusted to the diagonal position illustrated in Fig. 7, which is the reverse to that illustrated in Fig. 3, to thereby cause the spin-o-plane to turn to the right. Upon approaching the landing point the speed of descent is slowed up by diminishing the downward pitch of all wings by turning wheel 109, as shown in Fig. 8, which also shows the tail airfoil flapping freely, by reason of the fact that same have been released from their correlated controls. Prior to landing descent of spin-o-plane is stopped completely by reversing the pitch of all wings from downward to upward and by utilizing the flywheel momentum of the revolving wings and engines, also just prior to landing the legs, 11, 12 and 13 are moved to the position illustrated in Fig. 9, so that when the spin-o-plane finally settles it will be in a level position, irrespective of the roughness or evenness of the terrain.

I claim for my invention:—

1. In a flying machine: a body for pilot and load; an upright extension above body; a post pivotally mounted upon extension; a hub rotatably mounted upon post; four spider arms extending out from bottom of hub; wings mounted upon the ends of said spider arms; a second hub rotatably mounted upon first hub; four spider arms extending from the top of second hub; wings mounted upon outer ends of said spider arms; two engines attached to two opposite spider arms on second or top hub; a transmission shaft connecting the two engines directly thru the top of said second hub; a pinion on transmission shaft; a beveled gear attached to top of first or lower hub or to extension above it, geared with pinion of transmission shaft.

2. In a flying machine: a carriage or body for pilot; an element rotatably mounted upon body; means of conveying rotary controls on body to rotary controls on said rotatably mounted element, regardless of its motion in rotation, consisting of: a first sun gear attached to the part of body upon which said element is rotatably mounted with same axis as element; a second sun gear attached to said rotatably mounted element; for each said control a third sun gear rotatably mounted upon body near first sun gear and controlled from body; for each control a fourth sun gear in the same ratio to the third sun gear for the same control as the second is to the first, rotatably mounted upon said element; planet gears geared with both first and second sun gears; planet gears for each control geared with both third and fourth sun gears for that control; a free-to-rotate ring or piece upon which all of the planet gears are rotatably mounted, either held in position by planets or rotatably mounted upon body or element; gearing within said element geared with each fourth sun gear mounted upon element to control places as desired; all of the above planetary gearing placed whether outside of the means by which element is rotatably mounted upon body, such as post and shaft, or upon either end of the said means of mounting element on body; in the latter case, either the first sun gear is attached to body thru a tube inside of said means of mounting element on body, and each third sun gear on the same end of a telescope shaft inside of said tube, over which it is controlled from body, or the second sun gear is attached to element over tube inside of said means of mounting element on body and each fourth sun gear on the same end of a telescope shaft inside of said tube, over which it carries the control to the rotatably mounted element.

3. In a flying machine: a body for pilot and load; an upright extension above body; a post pivotally mounted upon extension; a hub rotatably mounted upon outside of post; spider arms extending out from bottom of hub; a wing pivotally mounted upon end of each spider arm; three rods extending downward from the base of each spider arm, one rod under each spider arm being joined at its bottom with one from each of the adjacent spider arms, all placed so that they will clear the pivot or hinge joint between hub and post and the extension above body when post with said rods are turned upon said pivot within the limits in which it is made to turn; for each wing, a tension brace from its spider arm in the middle of wing to the top of hub; from the same place on each spider arm, two tension braces, one to the bottom of each rod below the adjacent spider arms where it is attached to the other two rods; a post extension above and to said hub; a second hub rotatably mounted upon the outside of post extension; four spider arms extending from the top of second hub; a wing pivotally mounted upon each of four said spider arms; an engine mounted upon each of two opposite said spider arms; a post or braced extension above second hub; four short bracket arms out from bottom of second hub; three tension braces from each spider arm at the middle of wing, one to the top of extension above second hub and one to the end of each bracket arm to the side of bottom of said hub; three tension braces from each engine, one to top of said extension and one to end of bracket arm on said hub to the side of spider arms on which the engines are mounted; gearing thru which power of engines is applied to cause rotation of the top of post extension above the first hub, from the second hub.

4. In a flying machine: a body for pilot and load; an extension above body; a post pivotally mounted upon extension; a segment gear attached to bottom of post, with its center in line with axis of pivot or hinge joint between post and extension; a pinion geared with segment gear, on a shaft rotatably mounted upon extension; rotary gearing in extension on body connecting a pilot wheel or crank to control rotation of said pinion; a hub rotatably mounted upon post, a second hub rotatably mounted upon first hub; spider arms evenly spaced extending out from each hub, wings pivotally mounted upon the outer end of each spider arm.

5. The combination in a flying machine, of a series of pitch controlled revolving wings, a second series of pitch controlled revolving wings mounted in axial alignment with said first mentioned series, power means mounted to revolve at a distance from the revolving axis of said wings for reversely revolving one series relative to the other, and means to cause both of said series to revolve in the same direction.

6. The combination in a flying machine, of a series of pitch controlled revolving wings, a second series of pitch controlled revolving wings mounted in axial alignment with said first mentioned series, power means carried by one of said series at a distance from its revolving axis for reversely revolving the same relative to the other series, and means to cause both of said series to revolve in the same direction.

7. The combination, in a flying machine, of two series of co-axial revolving wings, prime movers mounted to revolve at a distance from the revolving axis of said wings, means whereby the generated power of said prime movers causes the two series of revolving wings to revolve oppositely and means whereby air pressure upon said wings during descent and the momentum of the revolving prime movers cause both of said series to revolve in the same direction.

8. The combination in a flying machine, of an upper series of revolving wings, engines for driving said series mounted to revolve in the plane thereof at a distance from its revolving axis, a lower series of revolving wings mounted in axial alignment with said upper series adapted to revolve oppositely to the latter during ascent and flight, and means to cause both of said series to revolve in the same direction during descent.

9. A mechanism for transmitting rotary controls from the exterior to the interior of a rotating member, comprising a stationary member, a sun gear mounted thereon, a rotating member mounted upon said stationary member, a sun gear mounted upon said rotating member, a second rotating member, a set of planet gears rotatively mounted upon said second rotating member and meshing with both of said sun gears, means for rotating said first mentioned rotating member, a second set of sun gears mounted upon said stationary and rotating members, said second set of sun gears being in the same ratio to each other as said first mentioned set of sun gears are to each other, a second set of planet gears rotatively mounted upon the same rotating member as said first mentioned set of planet gears for meshing with both of said last mentioned sun gears, and a control mounted within the first mentioned rotating member adapted to be actuated by said second set of sun and planet gears.

10. The combination in a flying machine, of a body, an element rotatably mounted thereon, means for rotating said element, rotary controls on said body, rotary controls on said element, and mechanism interposed between said rotary controls whereby rotary motion of the body controls is imparted to the element controls, said mechanism comprising fixed sun gears mounted upon said body and element, other sun gears attached to the rotary controls on said body and element, and planetary gearing for interconnecting said sun gears.

11. The combination in a flying machine, of a body, an element rotatably mounted thereon, means for rotating said element, a series of rotary controls on said body, a series of rotary controls on said element, and mechanism interposed between said rotary controls whereby rotary motion of the body controls is imparted to the element controls, said mechanism comprising fixed sun gears mounted upon said body and element, other sun gears attached to the rotary controls on said body and element, a freely rotating member, and planetary gearing carried thereby for interconnecting said sun gears.

12. The combination in a flying machine, of a body, an element rotatably mounted thereon, means for rotating said element, a series of rotary controls on said body, a series of rotary controls on said element, and mechanism interposed between said rotary controls whereby rotary motion of the body controls is imparted to the element controls, said mechanism comprising fixed sun gears mounted upon said body and element, other sun gears attached to the rotary controls on said body and element, a freely rotating member, a set of planetary gears mounted on said member and intermeshing with said fixed sun gears, and a set of planetary gears mounted on said member for each pair of rotary controls and for intermeshing with the sun gears thereof.

13. The combination in a flying machine, of a body, a series of rotary controls on said body, a plurality of sleeve shafts rotatively mounted in said body in co-axial relation, rotary controls on said sleeve shafts, and mechanism interposed between the rotary controls on the body and the rotary controls on said sleeve shafts whereby rotary motion of the body controls is imparted to the shaft controls, said mechanism comprising fixed sun gears mounted upon said body and sleeve shafts, other sun gears attached to the rotary controls on said body and sleeve shafts, and planetary gearing for interconnecting said sun gears.

14. The combination with a flying machine, of a mechanism for transmitting proportionate differential rotation from between two rotative members to two other rotative members comprising a support, four members rotatably mounted in co-axial relation upon said support, sun gears attached to the support and three of said members, and two sets of planetary gearing rotatably mounted upon the fourth of said members, each of said sets intermeshing with two sun gears which are in the same ratio as the other two sun gears.

15. A mechanism for transmitting proportionate differential rotation from between one series of rotative members to another series of rotative members comprising a double series of rotatable members mounted in co-axial relation, one of said members functioning as a support for the series, sun gears attached to the rotatable members of each series, another rotatable member mounted in co-axial relation to said double series of rotatable members, and sets of planetary gearing rotatably mounted upon said last mentioned rotatable member, each of which sets intermeshes with one sun gear of each series.

16. The combination in a flying machine, of a body, an element rotatably mounted thereon, means for rotating said element, a rotary control on said body, a rotary control on said element, and mechanism interposed between said rotary controls whereby rotary motion of the body control is imparted to the element control, said mechanism comprising fixed sun gears mounted upon said body and element, other sun gears attached to the rotary controls on said body and element, planetary gearing for interconnecting said sun gears, means for rotating the sun gear of the body control, a controlled member upon the rotatable element, and means connecting the element control with said controlled member for actuating the latter.

17. The combination in a flying machine, of a support, an element rotatably mounted thereon, rotary controls mounted upon said support and element, and mechanism interposed between the support control and element control whereby the latter is actuated by the former regardless of the rotation of said element, said mechanism comprising a sun gear attached to said support in co-axial relation with the axis of rotation of said element, a second sun gear attached to said element, a third sun gear attached to the support control, a fourth sun gear attached to the element control, said fourth sun gear being in the same ratio to the third sun gear as the second is to the first, a rotatable member disposed in co-axial relation with the sun gears and element, a set of planet gears rotatably mounted upon said member and intermeshing with the first and second sun gears and another set of planet gears similarly mounted upon said member and intermeshing with the third and fourth sun gears.

18. The combination in a flying machine, of a support, an element rotatably mounted thereon, rotary controls mounted upon said support and element and mechanism interposed between the support controls and element controls whereby the latter are actuated by the former regardless of the rotation of said element, said mechanism comprising a sun gear attached to said support in co-axial relation with the axis of rotation of said element, a sun gear attached to said element, a sun gear attached to each support control, a sun gear attached to each element control, a rotatable member disposed in co-axial relation with the sun gears and element, a set of planet gears rotatably mounted upon said member and intermeshing with the first and second mentioned sun gears, and a set of planet gears similarly mounted upon said member for each support control and for intermeshing with the sun gear thereof and the corresponding sun gear of the element control actuated thereby, said element control sun gears being in the same ratio to their corresponding support control sun gears as the element sun gear is to the support sun gear.

19. A mechanism for transmitting rotary motion comprising a fixed member, a shaft rotatively mounted on said member, fixed sun gears mounted on said member and shaft, other sun gears mounted for independent rotation on said member and shaft, planetary gearing for interconnecting said sun gears, actuating means for said mechanism connected with one of said independently rotative sun gears, a controlled element, and means connecting the latter with the other independently rotative sun gear.

20. A mechanism for transmitting rotary motion comprising a fixed member, a shaft rotatively mounted on said member, fixed sun gears mounted on said member and shaft, other sun gears mounted for independent rotation on said member and shaft, a rotative member, planetary gearing carried by said rotative member for interconnecting said sun gears, means for rotating the independently rotative sun gear on said member, a controlled member, and means for connecting the independently rotative sun gear of said shaft with said controlled member.

21. A mechanism for transmitting rotary motion comprising a fixed member, a shaft rotatively mounted upon said member, fixed sun gears mounted upon said member and shaft, other sun gears mounted for independent rotation upon said member and shaft, a series of planet gears intermeshing with said fixed sun gears, a series of planet gears intermeshing with said independently rotative sun gears, actuating means for said mechanism connected with one of said independently rotative sun gears, a controlled element, and means connecting the latter with the other independently rotative sun gear.

22. A mechanism for transmitting rotary motion comprising a fixed member, a shaft rotatively mounted upon said member, fixed sun gears mounted upon said member and shaft in axially aligned relation, sun gears mounted for independent rotation upon said member and shaft also in axially aligned relation, a rotative member, a series of planetary gears rotatively mounted upon said rotative member and intermeshing with said fixed sun gears, another series of planetary gears mounted upon said rotative member and intermeshing with said independently rotative sun gears, actuating means for said mechanism connected with one of said independently rotative sun gears, a controlled element, and means connecting the latter with the other independently rotative sun gear.

23. A mechanism for transmitting rotary motion to a member rotatably mounted upon a rotating element comprising a fixed base for said rotating element, fixed sun gears mounted upon said base and element, other sun gears mounted for independent rotation upon said base and element, planetary gearing for inter connecting said sun gears, means for imparting rotation to one of said indepedently rotative sun gears, and means for connecting the other independently rotative sun gear to the rotatably mounted member first mentioned.

24. A mechanism for transmitting rotary motion comprising a base, a shaft rotatively mounted therein, fixed sun gears mounted upon said base and shaft, other sun gears mounted for independent rotation on said base and shaft, said last mentioned sun gears being in the same ratio as said fixed sun gears, planetary gearing for interconnecting said sun gears, actuating means for said mechanism connected with one of said independently rotative sun gears, a controlled element, and means connecting the latter with the other independently rotative sun gear.

In testimony whereof I affix my signature this 29th day of December, 1927.

WILLIAM CALHOUN THOMPSON.